United States Patent
Carlos

(10) Patent No.: US 8,631,638 B2
(45) Date of Patent: Jan. 21, 2014

(54) METHOD, SYSTEM AND APPARATUS FOR PROVIDING WATER TO A HEAT ENGINE VIA A DAMMED WATER SOURCE

(75) Inventor: Rene Carlos, College Park, MD (US)

(73) Assignee: Rene Carlos, College Park, MD (US)

( * ) Notice: Subject to any disclaimer, the term of this patent is extended or adjusted under 35 U.S.C. 154(b) by 824 days.

(21) Appl. No.: 12/860,652

(22) Filed: Aug. 20, 2010

(65) Prior Publication Data

US 2012/0038173 A1 Feb. 16, 2012

Related U.S. Application Data

(63) Continuation-in-part of application No. 12/854,707, filed on Aug. 11, 2010, now abandoned, and a continuation-in-part of application No. 12/858,311, filed on Aug. 17, 2010.

(51) Int. Cl.
  *E02B 9/00* (2006.01)
  *F02C 7/16* (2006.01)

(52) U.S. Cl.
  USPC .......... 60/39.181; 60/806; 415/224.5; 405/78

(58) Field of Classification Search
  USPC ................ 60/775, 784, 39.15, 39.181, 39.17, 60/39.19, 39.3, 39.53–39.59, 806, 39.83, 60/716; 415/224.5; 405/78
  See application file for complete search history.

(56) References Cited

U.S. PATENT DOCUMENTS

| | | | |
|---|---|---|---|
| 2,201,615 A | 5/1940 | La Mont | |
| 3,869,857 A | 3/1975 | Margen | |
| 4,307,299 A | 12/1981 | Norton | |
| 4,343,696 A | 8/1982 | Hung | |
| 4,519,749 A | 5/1985 | Baumberg | |
| 4,797,563 A | 1/1989 | Richardson | |
| 4,896,499 A | 1/1990 | Rice | |
| 5,099,648 A | 3/1992 | Angle | |
| 5,142,870 A * | 9/1992 | Angle | 60/668 |
| 5,195,587 A | 3/1993 | Webb | |
| 5,590,530 A | 1/1997 | Owen | |
| 5,742,515 A | 4/1998 | Runkle et al. | |
| 6,325,570 B1 | 12/2001 | Pohjamo | |

(Continued)

FOREIGN PATENT DOCUMENTS

| | | |
|---|---|---|
| FR | 2696506 A | 4/1994 |
| JP | A-54-096643 | 7/1979 |
| JP | A-08-049641 | 2/1996 |

OTHER PUBLICATIONS

Oct. 20, 2011 International Search Report issued in International Application No. PCT/US2011/037663.

(Continued)

*Primary Examiner* — Andrew Nguyen
(74) *Attorney, Agent, or Firm* — LeonardPatel PC

(57) ABSTRACT

A method, system and apparatus are provided that provide water to a heat engine via a dammed water source. The water may be tapped for cooling of and/or injection into a heat engine. Further, steam from operation of the heat engine and/or directing exhaust gases of a heat engine into a water flow in an exit channel may be collected and harnessed for power generation in a steam-driven power generator, for industrial heating purposes and other industrial uses, and/or for cooling and subsequent use as potentially more pure water. Additionally, water mist may be sprayed into the exhaust gases for sound suppression purposes.

8 Claims, 13 Drawing Sheets

(56) References Cited

U.S. PATENT DOCUMENTS

| | | | |
|---|---|---|---|
| 6,546,723 | B1 | 4/2003 | Watten et al. |
| 6,638,024 | B1 | 10/2003 | Hancock |
| 6,930,407 | B2 | 8/2005 | Panholzer |
| 6,973,792 | B2 | 12/2005 | Hicks |
| 7,395,618 | B2 | 7/2008 | Jacobsen et al. |
| 7,523,603 | B2 | 4/2009 | Hagen et al. |
| 2004/0107701 | A1 | 6/2004 | Miyake et al. |
| 2008/0175703 | A1 | 7/2008 | Lugg |
| 2009/0180939 | A1 | 7/2009 | Hagen et al. |
| 2010/0083631 | A1 | 4/2010 | Foster et al. |
| 2010/0083632 | A1 | 4/2010 | Foster et al. |
| 2010/0083668 | A1 | 4/2010 | Foster et al. |
| 2010/0083669 | A1 | 4/2010 | Foster et al. |
| 2010/0107651 | A1 | 5/2010 | Hyde et al. |
| 2010/0107652 | A1 | 5/2010 | Hyde et al. |
| 2010/0108806 | A1 | 5/2010 | Chan et al. |
| 2010/0126178 | A1 | 5/2010 | Hyde et al. |
| 2010/0150742 | A1 | 6/2010 | Vetrovec |
| 2010/0183903 | A1 | 7/2010 | McGinnis et al. |

OTHER PUBLICATIONS

Final Office Action issued on Jul. 18, 2012, in U.S. Appl. No. 12/854,707.

Non-Final Office Action dated Feb. 2, 2012, for U.S. Appl. No. 12/854,707.

Sound Suppression Test Unleashes a Flood by Jeff Stuckey and Anna Heiney, http://www.nasa.gov/missions/shuttle/f_watertest.htmlhttp://www.nasa.gov/missions/shuttle/f_watertest.html (May 10, 2004).

Liquid Hydrogen as a Propulsion Fuel, 1945-1959, John L. Sloop, chapters 2-6, 7-1 through 7-14, and 10-5, http://history.nasa.gov/SP-4404/contents.htm.

Office Action issued in U.S. Appl. No. 12/858,311 on Sep. 23, 2013.

\* cited by examiner

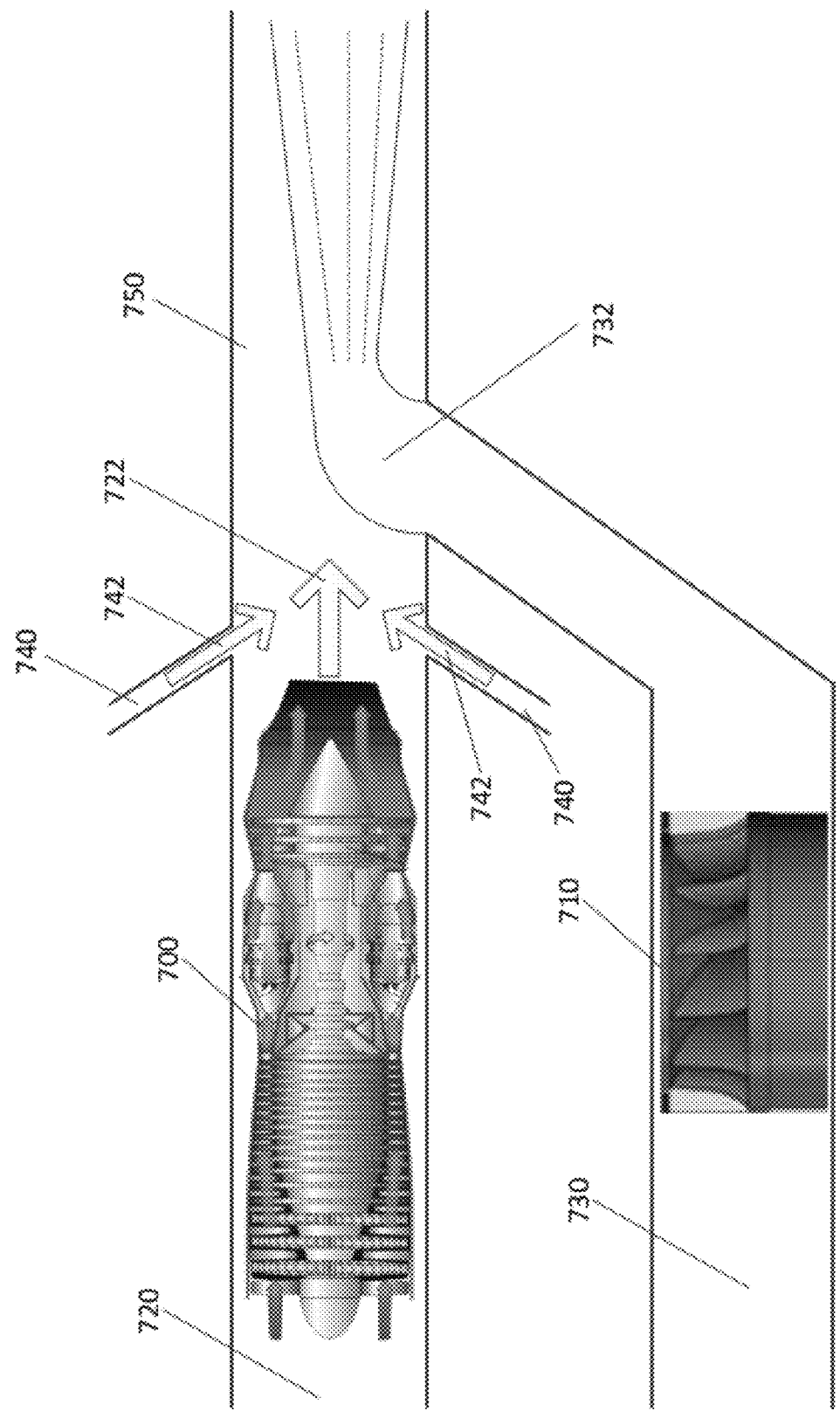

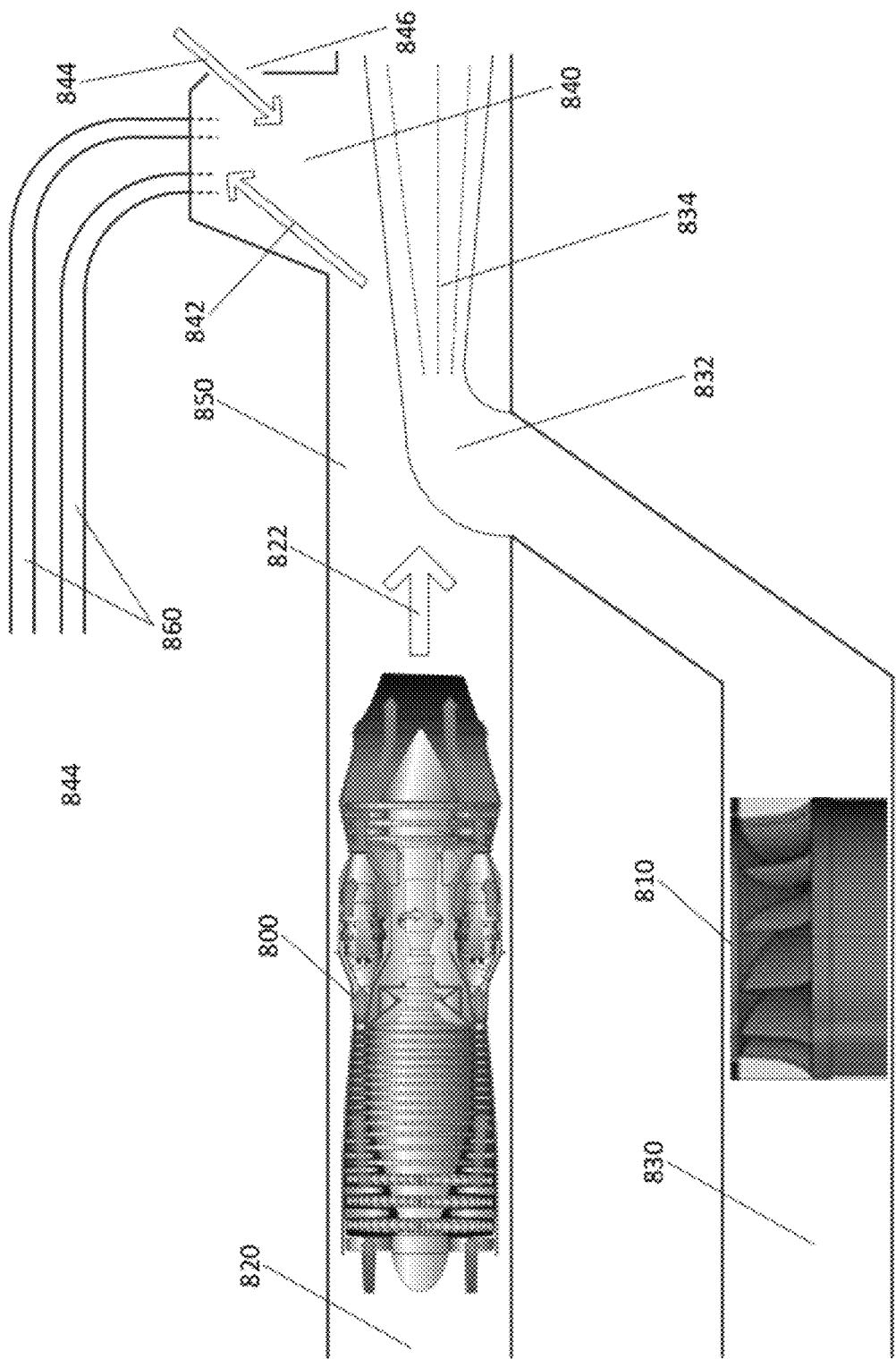

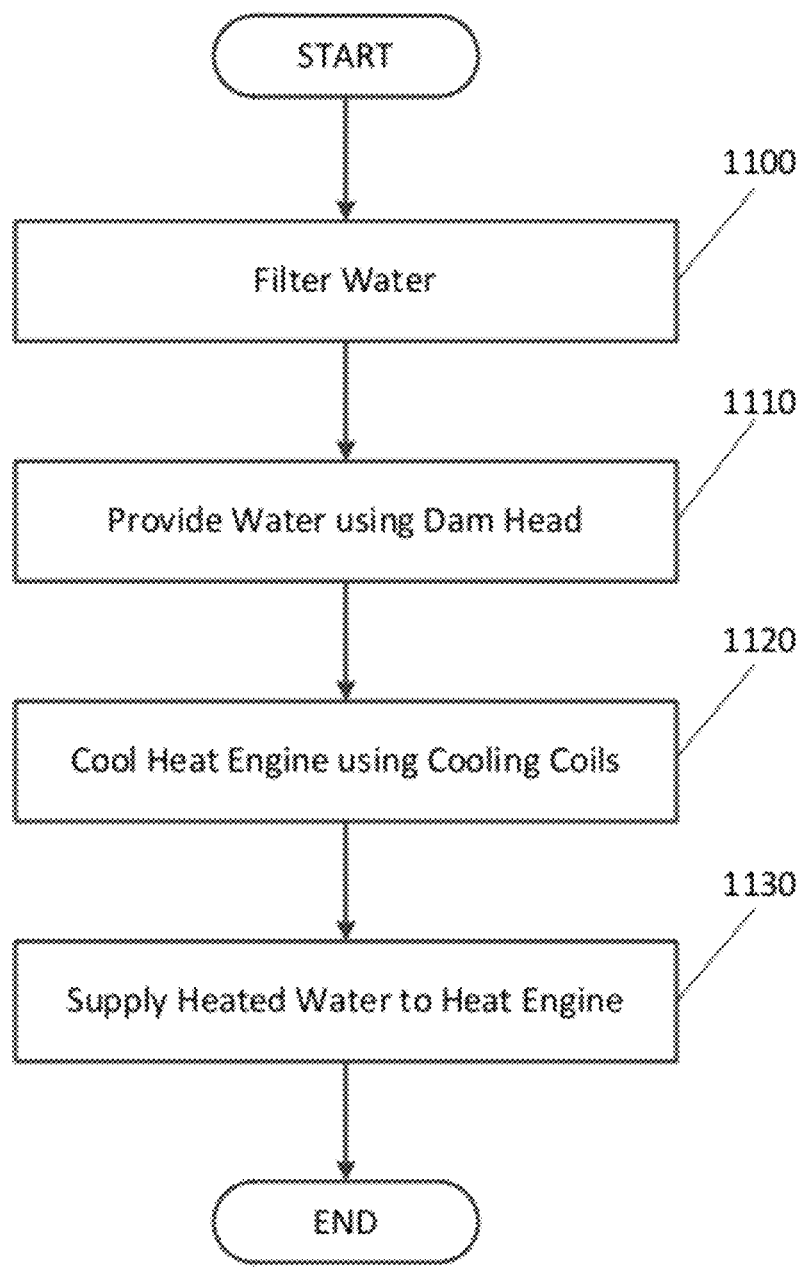

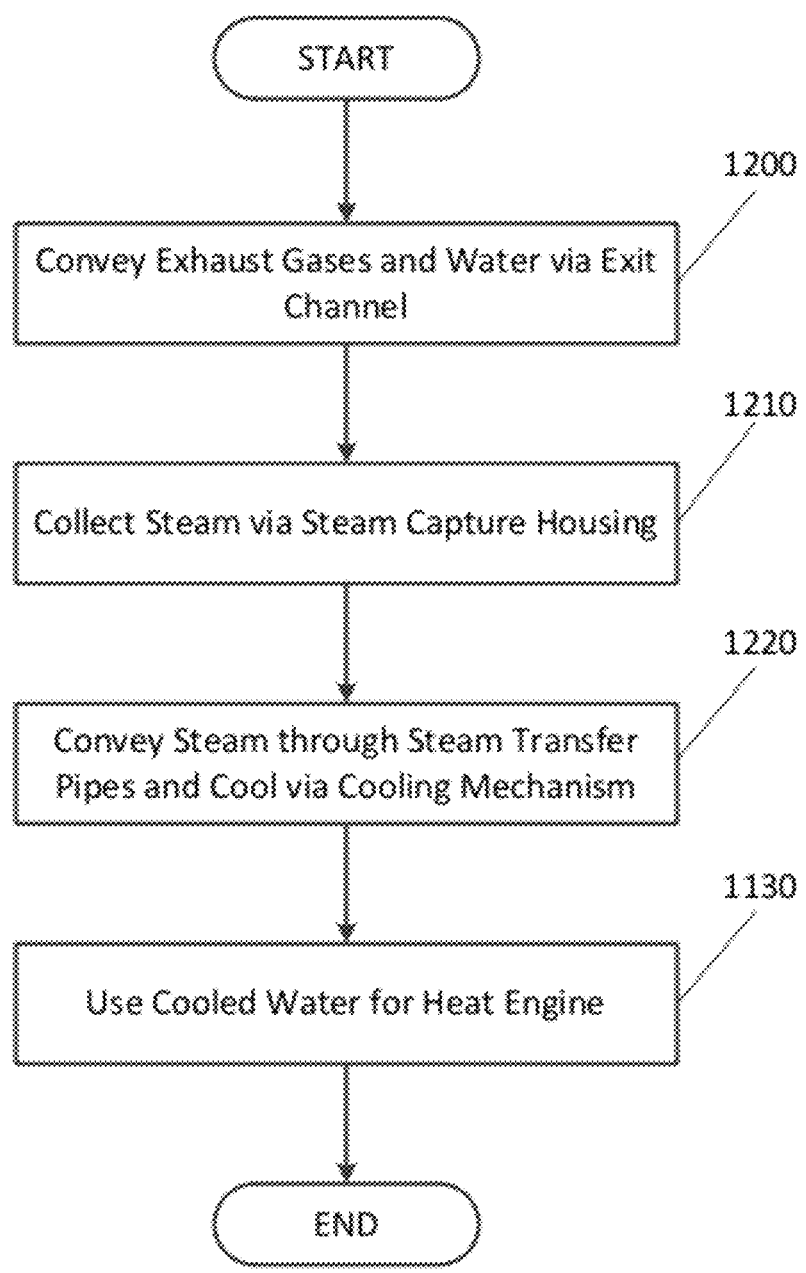

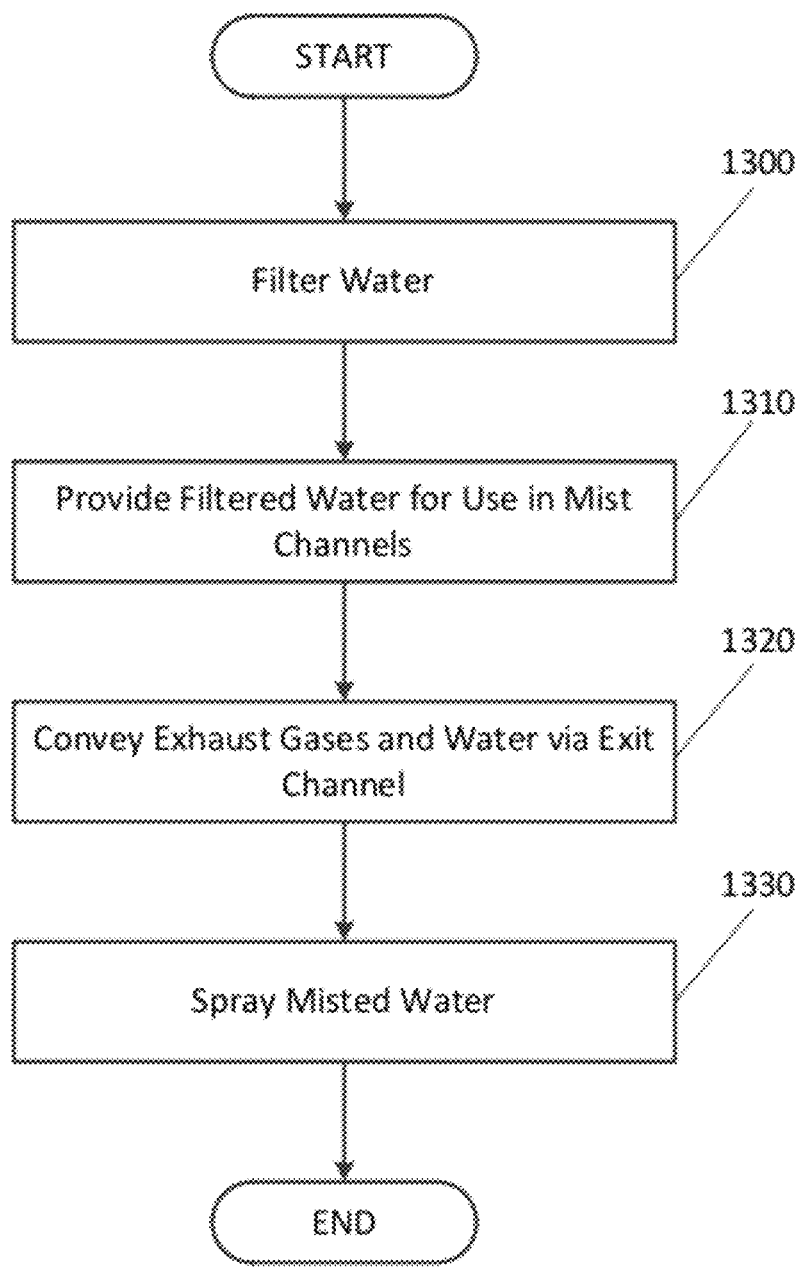

METHOD, SYSTEM AND APPARATUS FOR PROVIDING WATER TO A HEAT ENGINE VIA A DAMMED WATER SOURCE

CROSS REFERENCE TO RELATED APPLICATIONS

This application claims priority of U.S. patent application Ser. No. 12/854,707, filed Aug. 11, 2010, and Ser. No. 12/858,311, filed Aug. 17, 2010. The subject matter of these earlier filed applications is hereby incorporated by reference in its entirety.

BACKGROUND

1. Field

The present invention relates to a method, system and apparatus for managing water in a heat engine via a dam. More specifically, the method, system and apparatus use water from a dammed water source in/around the heat engine and/or recover the water for various uses.

2. Description of the Related Art

In power generation systems, gas turbines are known that extract energy from a combustible fuel. For instance, a gas turbine generally has an upstream multi-stage compressor that compresses air flowing into the engine, a combustion chamber where fuel (typically gas) is ignited and combusted with the compressed air, and a turbine that harnesses the energy from the flow of the combustion gases. The combusted gas is then expelled from the rear of the engine. The rotating turbine drives an electric generator that converts mechanical energy into electrical energy, and thus creates electricity.

SUMMARY

Certain embodiments of the present invention may provide solutions to the problems and needs in the art that have not yet been fully solved by currently available gas turbine technologies. For example, certain embodiments of the present invention provide a method, system and apparatus that utilize dammed water for powering, sound suppression and/or cooling of a Brayton cycle heat engine, such as a gas turbine.

In one embodiment of the present invention, an apparatus includes a heat engine including a compressor having one or more stages. The apparatus also includes a water inlet configured to provide water from a dammed water source. The water inlet is configured to provide water from the dammed source that is driven, at least in part, by head created by a dam. The apparatus further includes cooling mechanisms configured to deliver cool water one or both of internally and externally to the heat engine.

In another embodiment of the present invention, a system includes an exit channel configured to accept and convey exhaust gases from a heat engine and water from a water channel. The system also includes a steam capture housing configured to collect steam from the exit channel. The system further includes one or more steam transfer pipes configured to convey the steam to a cooling mechanism.

In yet another embodiment of the present invention, a system includes a heat engine and an exit channel configured to convey exhaust gases generated by the heat engine away from the heat engine. The system also includes one or more mist channels configured to spray water mist into the exhaust gases in one or more of a nozzle of the heat engine and the exit channel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a side view of a gas turbine and a water turbine with mist injection for gas turbine exhaust, according to an embodiment of the present invention.

FIG. 8 is a side view of a gas turbine and water turbine with a steam recovery system, according to an embodiment of the present invention.

FIG. 11 illustrates a method for delivering water to a heat engine, according to an embodiment of the present invention.

FIG. 12 illustrates a method of recovering steam from an exit channel, according to an embodiment of the present invention.

FIG. 13 illustrates a flow diagram of a method for suppressing sound generated by operation of a heat engine, according to an embodiment of the present invention.

DETAILED DESCRIPTION

Figure 1:
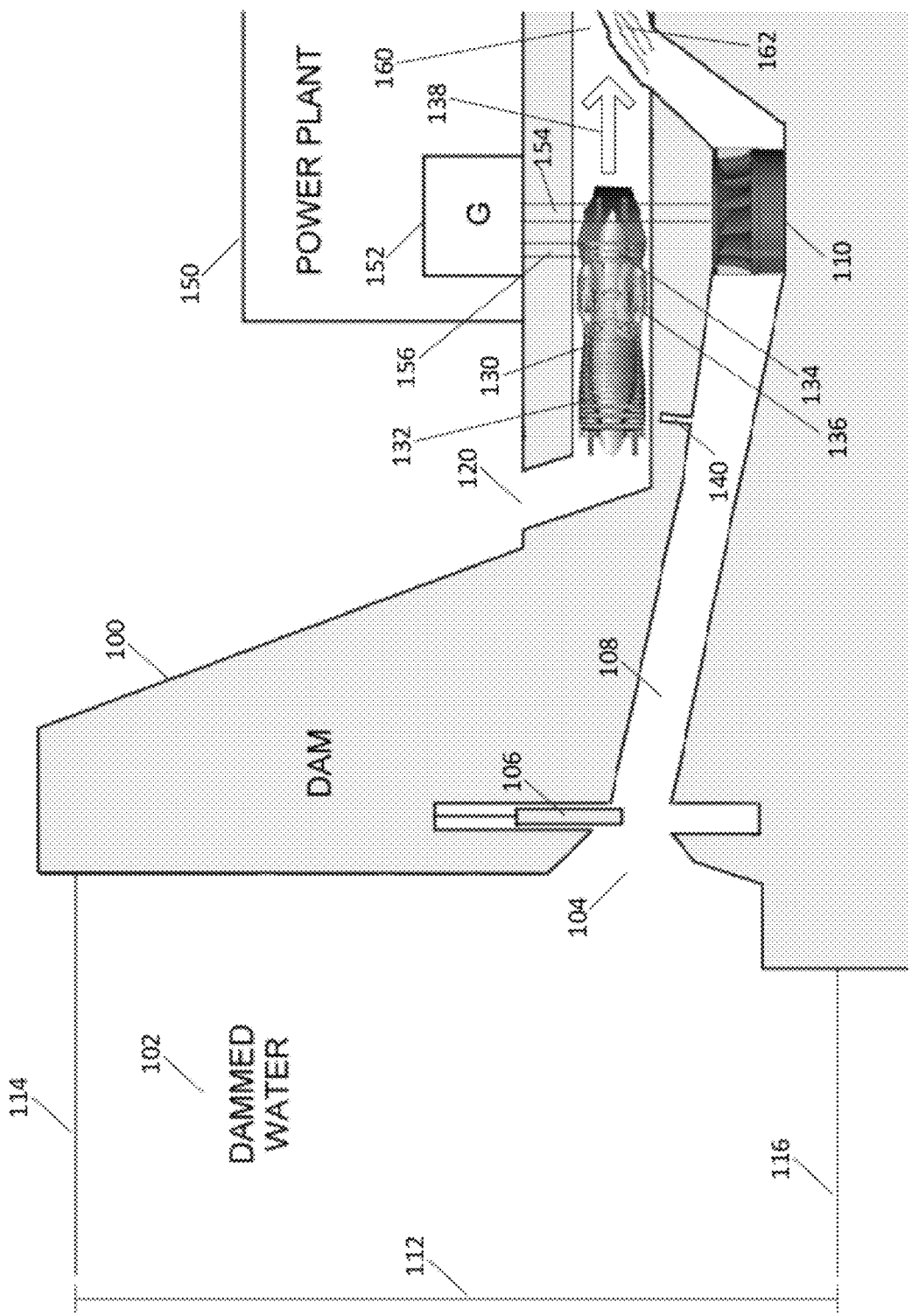
FIG. 1 is a side view of a dam system combining gas turbine power generation and hydroelectric power generation, according to some embodiments of the present invention.

It will be readily understood that the components of various embodiments of the present invention, as generally described and illustrated in the figures herein, may be arranged and designed in a wide variety of different configurations. Thus, the following more detailed description of the embodiments of a system and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Industrial gas turbine power generation systems typically generate a large amount of heat as hot compressed air is mixed with fuel and combusted in a combustor. Generally speaking, the greater the heat and pressure that is used, the more power and efficiency that can be realized by the gas turbine. However, the amount of pressure and heat that can be used generally depends on the temperature and pressure that the gas turbine's materials can tolerate. Injection of water may help to disperse some of the heat generated by the combustor and thus increase the amount of power that can be produced by the gas turbine. It is also generally true that the more mass an airflow supplied to the gas turbine has, the more power that can be generated. For instance, water can be injected into the gas turbine to create more mass.

However, using water from municipal sources has several disadvantages. Municipal water has a significant cost, particularly for the quantities of water that are used on an industrial scale. Also, using municipal water for injection into a gas turbine consumes water that could be used by other sources, particularly where water is not in abundant supply. Further, municipal water sources are usually supplied at a relatively low pressure.

Some embodiments of the present invention are able to take advantage of a dammed water supply to provide water for various uses in a heat engine. For instance, water may be tapped from a dammed water supply, filtered, and then routed via channels to one or more locations in or around the heat engine. Some embodiments of the present invention also route the water around hot sections via cooling channels for the dual purpose of cooling the hot sections of the heat engine and heating the water. Heat from the heat engine transfers through the walls of the cooling channels and is then transferred to the water in the cooling channel. Heat may be recuperated from the water by using the heated water to do work. The heated water may then be used as desired. Additionally, the water may be tapped and used as an exit mist that is sprayed into hot exhaust gases exiting the heat engine for sound suppression purposes.

Water exiting the heat engine system may further be tapped for users of the remaining heat, such as for the purposes of industrial heating or steam use. Some embodiments may tap the exit water to drive a steam-driven power generator. Exit or near-boiled water may also be tapped for use in the compressor. Expanding steam may drive one or more compressor stages, and the steam may be recondensed by circulating or adding additional water (e.g., via a heat exchanger or via direct injection). The exit flow may also be tapped and condensed for high purity uses. The water could either be condensed in a tower or with other water available to the system. This condensed, high-purity water could be used as engine coolant, capable of going around, or even into, any hot section of the heat engine. Also, exit water could be stored in a tower and the extra head of the tower could be used to start a compressor of the heat engine more quickly. Further, some embodiments of the present invention may take advantage of dam head to drive water into/around the system. Head may be defined as the difference in height between the water's source and water outflow.

Some embodiments of the present invention have significant advantages over conventional systems. By using dammed water, municipal water is conserved. Use of dammed water saves significant cost that would be required for the quantities of water that are used on an industrial scale and also frees up municipal water that would have been used in the heat engine for other purposes, particularly where water is not in abundant supply. Further, issues due to the relatively low pressure of municipal water sources are resolved. Additionally, steam may be used to generate additional power and/or to provide heat. Also, the steam and/or water may be used to help to start and/or drive the compressor of the heat engine. Further, many heat engines tend to produce a high level of noise pollution, and some embodiments of the present invention reduce this noise pollution by injecting a mist of water into hot exhaust gases leaving the heat engine. Additionally, well-controlled cooling (e.g., via thermostats or active controls on coolant flow) helps improve dispatchability by reducing warm-up losses during heat engine starts.

A heat engine takes advantage of heat energy to perform mechanical work. The heat engine may be any form of heat engine that is capable of expelling high velocity exhaust and generates heat from a heat source. One example of a heat engine is a Brayton cycle heat engine. A Brayton cycle heat engine may be an internal combustion engine such as a gas turbine engine or a piston engine, or an external combustion engine such as a steam engine. The engine may take any desired form and is not limited by this disclosure in any way. The heat source of the heat engine may be provided by various fuels in some embodiments. For instance, some embodiments may use gases (such as natural gas), liquids (such as petroleum fuels), sufficiently-pulverized coal, biomass, slurries, suspensions, radioisotopes, solar absorbers, geothermal transfer fluids, or any other fuel suitable for driving a heat engine. Due to an advanced pipeline infrastructure at least in the United States, natural gas may be more economical and/or cleaner than many of the other fuel alternatives for U.S. implementations at many existing or potential dam sites.

FIG. 1 is a side view of a system combining gas power generation and hydroelectric power generation, according to some embodiments of the present invention. The system depicted here uses exhaust gases from a gas turbine 130 to pull water and generate lower pressure in an exit channel 160, causing the system to behave as though head 112 were higher than it mechanically is. However, some embodiments of the present invention do not take advantage of this synergy and have a gas turbine that does not interact with the water channel. Further, while often advantageous, it is not necessary for a water turbine to be present at all in some embodiments, and dam head may be used for the purpose of driving lower pressure stages of a compressor of a gas turbine. Water may also be used for injection into and/or around the gas turbine in some embodiments.

The depicted system includes a dam 100 holding back dammed water 102. Water enters dam 100 via a water intake 104 and the flow of the water is controlled by control gate 106. Control gate 106 may be raised or lowered to increase, decrease, or completely restrict water flow to a penstock 108. While penstock 108 is depicted as a water channel here, a pipe, a conduit, or any other suitable water channel or water piping mechanism may be used. After passing control gate 106, the water enters penstock 108 that supplies the water to a water turbine 110. Dammed water 102 has a certain head 112, which is the difference in height between the level of water 114 before the dam 100 and the level of water 116 after the dam 100 (i.e., water that has passed through the dam and is now downstream in the river). However, in some embodiments, the difference in height may be anywhere and not necessarily near the top of the dam.

The system also includes an air intake 120 that supplies air to gas turbine 130. While gas turbine 130 is shown in this embodiment, any suitable heat engine may be used. In this embodiment, compressor water channel 140 provides water that powers one or more stages of a compressor 132 of gas turbine 130 via a direct drive shaft (not shown). The driven stages of compressor 132 include fewer than all of the fan stages that make up the compressor. The direct drive shaft uses gravity-driven potential energy from head 112 of dammed water 102 and is driven by water running through compressor water channel 140. Keeping at least some stages of compressor 132 running may be advantageous over existing heat engine systems since compressor 132 can be spun up to generate power more quickly, and with less energy cost, than a typical gas turbine. This may allow gas turbine 130 to generate on-demand power more quickly, efficiently and effectively than existing gas turbines.

In some other embodiments, in lieu of a direct drive shaft, water from compressor water channel 140 runs through a second water turbine that powers another generator. In yet other embodiments, water from compressor water channel 140 may drive external blades that power fans of the first stage of compressor 132.

In some embodiments, dammed water 102 may be used for various purposes in or around gas turbine 130. Some of the purposes include cooling gas turbine 130, adding mass to the airflow of gas turbine 130, and suppressing sound from gas turbine 130. Dammed water may be supplied for these purposes via compressor water channel 140, or via a different water supply channel (not shown).

A power plant 150 houses a generator complex 152 that generates power for the system. Generator complex 152 may include a single generator or multiple generators. Water turbine 110 and gas turbine 130 are operably connected to generator complex 152 via shafts 154 and 156, respectively. Shafts 154 and 156 may drive the same generator or different generators, depending on the desired implementation. The rotation of water turbine 110 and gas turbine 130 rotates shafts 154 and 156, respectively. In some embodiments, as shafts 154 and 156 turn, a series of magnets inside generator complex 152 also turn. The magnets in such generators generally rotate past copper coils, producing current by generating moving electrons. However, some users may simply accept shaft work in other embodiments. In this embodiment, it is possible to operate water turbine 110 alone, gas turbine 130 alone, or both, at any given time to achieve the desired power output. To further facilitate this selective operation, a gate mechanism (not shown) may be included in some embodiments to prevent water spray from water entering exit channel 160 from heading up exit channel 160 towards gas turbine 130 when gas turbine 130 is not operating.

Exhaust gases 138 from gas turbine 130 accelerate water 162 in exit channel 160 that has passed through water turbine 110. Accelerating the water in this fashion takes advantage of the Bernoulli principle and the Coandă effect to draw water into water intake 104 and through penstock 108 with greater pressure. The Bernoulli principle states that an increase in speed of a fluid occurs simultaneously with a decrease in pressure. The Coandă effect is the tendency of a rapidly moving fluid jet to be attracted to a nearby surface. In the context of these principles, a "fluid" may be a gas such as air.

The Bernoulli principle and the Coandă effect cause exhaust gases 138 to pull the water, decreasing pressure in the exit channel exit channel 160 and increasing a flow of water 162. Further, there is some entrainment of the water stream due to viscous forces. This lower pressure environment in exit channel 160 causes the system to behave as though head 112 of dammed water 102 is greater than it mechanically is. Specifically, the system behaves as though the exit for the water is lower than it mechanically is.

Also, the interaction between hot exhaust gases and water flowing in the exit channel generates steam. In some embodiments, the steam can be recovered for various purposes. For instance, the steam may be harnessed to drive one or more stages of compressor 132 in some embodiments.

Figure 2:
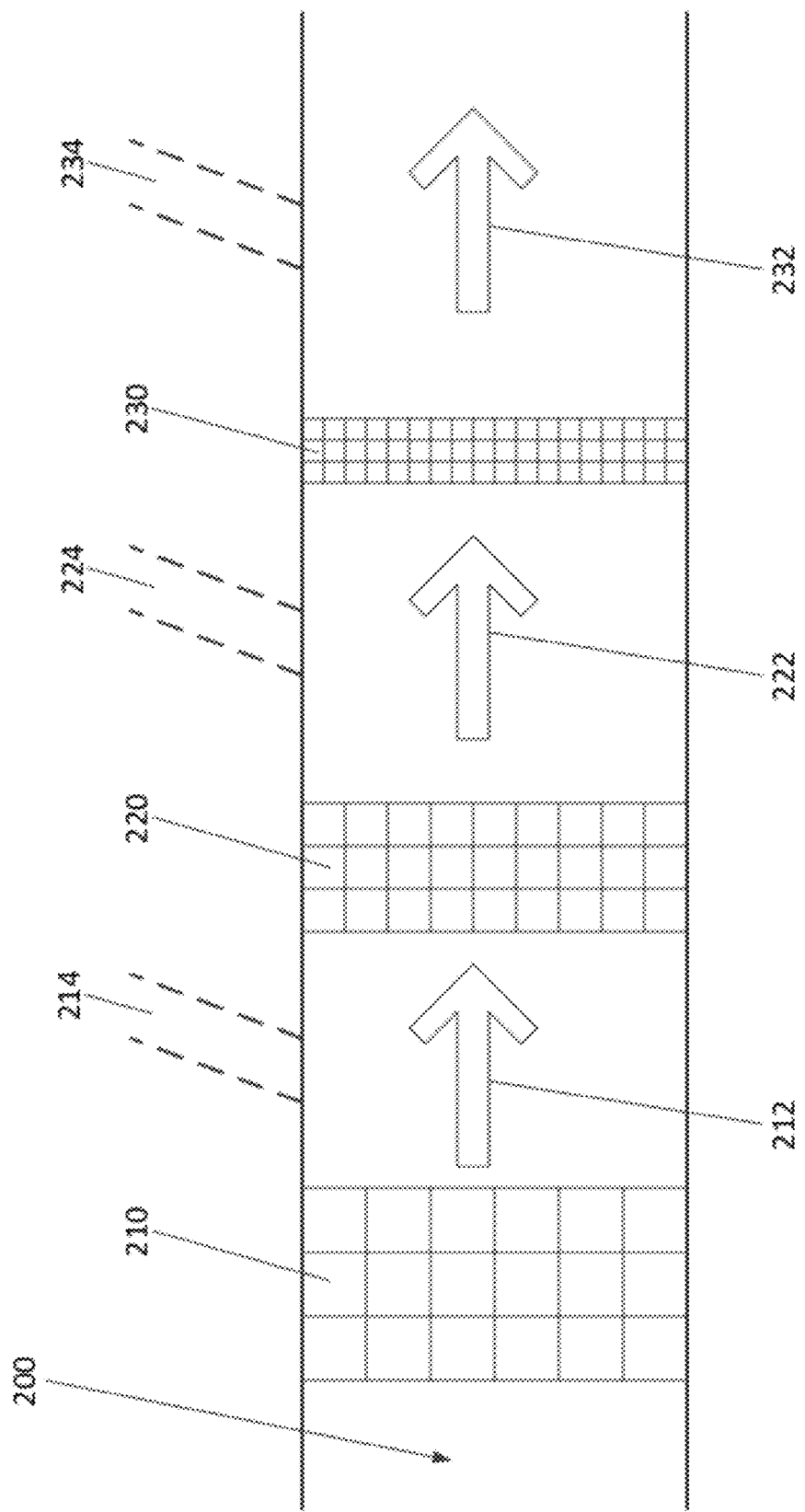
FIG. 2 is a side view of a water channel in a dam, according to an embodiment of the present invention.

FIG. 2 is a side view of a water channel 200 in a dam, according to an embodiment of the present invention. In FIG. 2, three water filters are present—a low purity water filter 210, a moderate purity water filter 220, and a high purity water filter 230. While three screen filters are shown in this embodiment, the number of filters used, the type of filter, and the quality of filtration performed by each filter is a matter of design choice. In some cases, increased levels of filtration may decrease water pressure from dam head. Accordingly, better filtration may need to be traded for higher water pressure in some embodiments.

In FIG. 2, low purity water filter 210 first encounters water flowing through water channel 200. Low purity water filter 210 may be, for instance, a relatively loose grid of bars that are designed to stop large debris, such as branches, logs, and larger fish. Flowing water 212 that has passed through low purity water filter 210 may be tapped by low purity water outlet 214. In some embodiments, uses for low purity water may include external cooling of a heat engine, for example.

Next, water that has passed through low purity water filter 210 encounters moderate purity water filter 220. Moderate purity water filter 220 filters out smaller debris than low purity water filter 210, such as leaves, small fish, and bugs. Flowing water 222 that has passed through moderate purity water filter 220 may be tapped by moderate purity water outlet 224. In some embodiments, moderate purity water filter 220 may be used to turn a wheel of a direct water drive mechanism, for example.

After passing through moderate purity water filter 220, water encounters high purity water filter 230. High purity water filter 220 filters out fine debris, and the purity of filtered water will vary based on the implementation. For instance, high purity water filter may be configured to filter out smaller debris, such as small pieces of leaves and dirt, or may be more fine and filter vary small particulates such as fine sediment. Flowing water 232 that has passed through high purity water filter 230 may be tapped by high purity water outlet 234. In some embodiments, high purity water filter 230 may be used for direct injection into a heat engine, for example.

While not shown in FIG. 2, one or more of water outlets 214, 224, and/or 234 may have a flow metering mechanism such as a gate or valve that increases, decreases, or completely restricts water flow in the respective water outlet. Further, various pumping mechanisms may be used to provide the filtered water to other sources, if needed for the specific implementation, particularly depending on pressure from dam head. Also, the use of each water flow is highly dependent on the specific implementation and architecture of the system. For instance, in some embodiments, higher levels of debris in the water stream may be tolerated depending on the design of the heat engine system, especially for external cooling purposes. Additionally, the level of purity of the water in the given river that is tapped will be a factor, and may further depend on what level of the dammed water is tapped. For instance, a water inlet for a water channel in a dam that is sufficiently high above the river bed to avoid much sediment inflow, but also low enough to avoid most floating logs and branches, may offer a higher purity prior to filtration. Further, water that is tapped for use in/around a heat engine may flow through a different water channel and filtration system than water that feeds a water turbine, for example.

Figure 3:
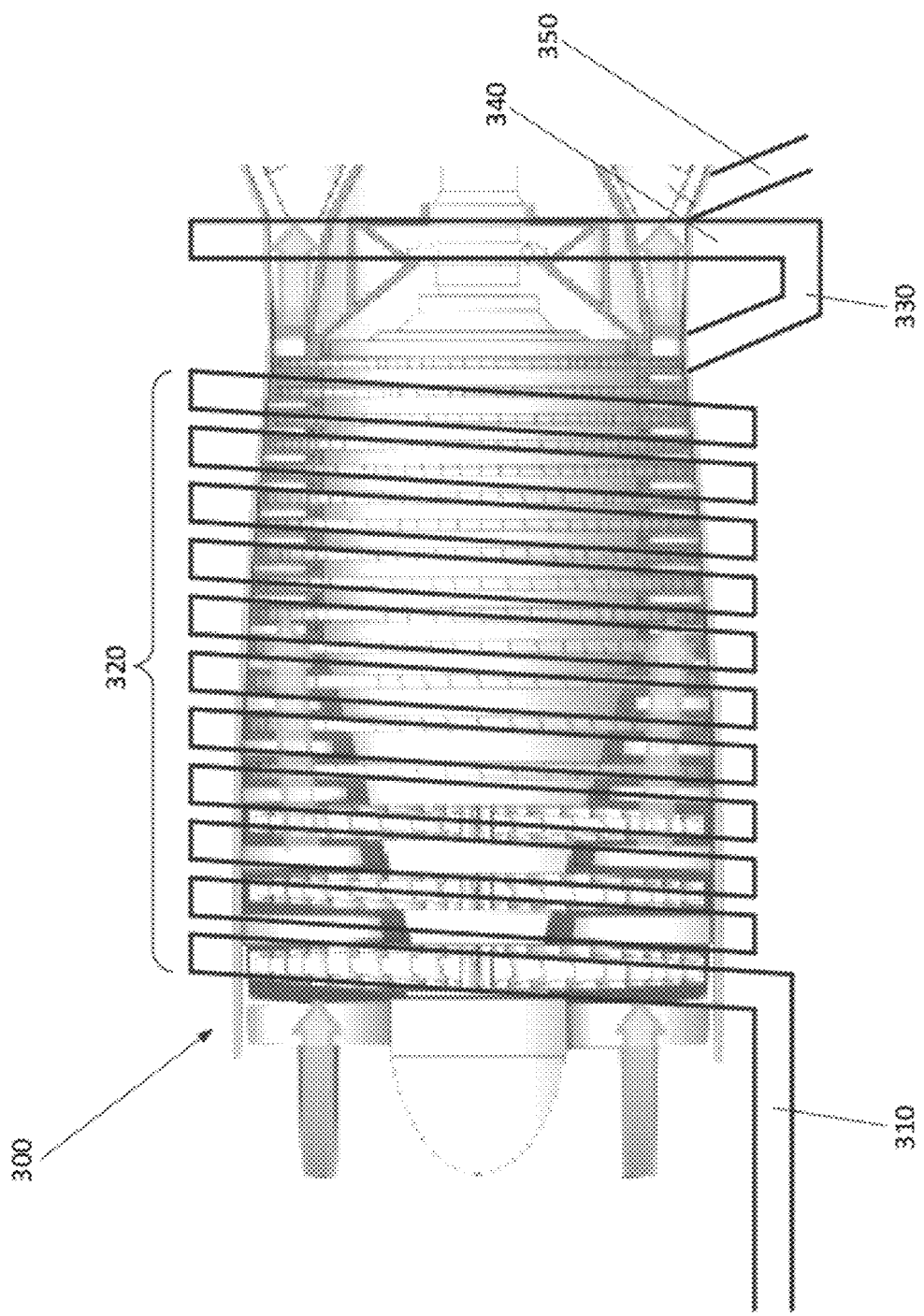
FIG. 3 is a side view of compressor stages of a gas turbine and a cooling system, according to an embodiment of the present invention.

FIG. 3 is a side view of compressor stages of a gas turbine 300 and a cooling system, according to an embodiment of the present invention. Water from a dam flows into the cooling system via water inlet 310. Generally speaking, it is desirable to have the water be as cold as possible, and cooler temperatures in the compressor also have the added benefit of less thermal expansion and contraction. Without further cooling, the water can be as cool as the dammed water source, and water deeper down in the dammed water source will generally be the coolest available. Further, some rivers have melting snow as a major water source, so the temperature of the water may be naturally cool. If further cooling is desired for some embodiments, it is possible to cool the water via any known cooling mechanism, such as refrigeration, liquids such as liquid nitrogen, helium and other room temperature gases, and evaporative cooling as commonly known for industrial cooling purposes.

Water flows through water inlet 310 and into cooling coils 320. While cooling coils are shown in this embodiment, any suitable cooling mechanism may be used, such as a cooling jacket or cooling passages. Cooling coils 320 are water channels that wrap around the outside of the compressor stages of gas turbine 300. The water may not enter the compressor stages at all. Water may be routed through stator blades and/or shaft support struts of the compressor to cool these elements. Or, in some embodiments where the water is sufficiently pure, the water may be sprayed into the compressor directly via valve or nozzle mechanisms (not shown) in cooling coils 320. The number of cooling coils, and the extent of the compressor that is cooled thereby, is a matter of design choice. Generally speaking, the higher pressure the compressor stage is, the greater the heat that will be generated by that compressor stage.

As the water flows through cooling coils 320, heat transfers to water in cooling coils 320 and the water becomes progressively warmer. The water in cooling coil 320 may heat to the point where the water is supercritical. A supercritical fluid has a temperature and pressure above its critical point (conditions where a phase boundary ceases to exist). In general, supercritical fluids have properties somewhere between a liquid and a gas. Further, there is no surface tension in a supercritical fluid.

Figure 4:
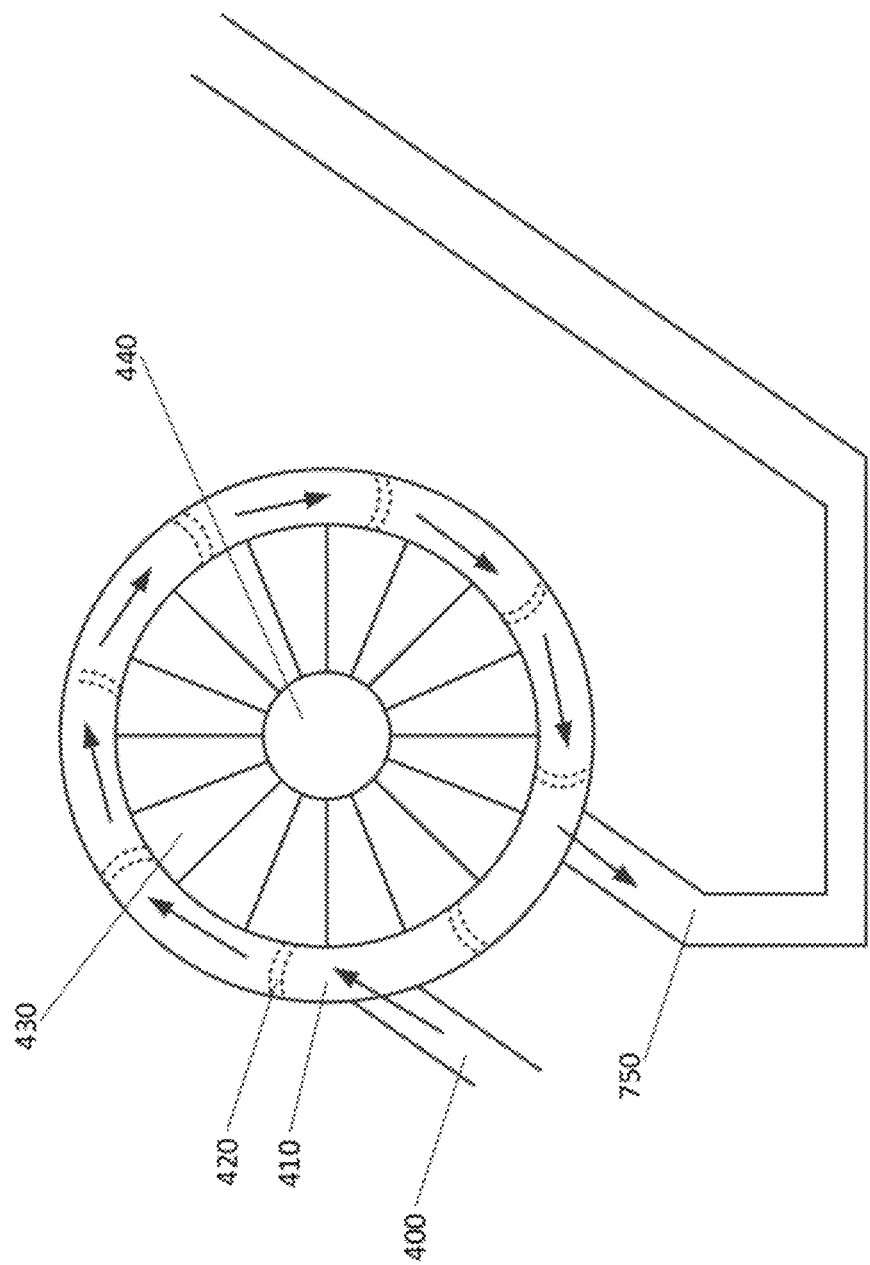
FIG. 4 is a front view of a compressor fan stage that is driven by heated or supercritical water flowing through external blades, according to an embodiment of the present invention.

This hot, or even supercritical, water may leave cooling coil 320 via a connecting pipe 330 and enter a hot water supply pipe 340. The water may then be used to cool even hotter parts of the gas turbine, such as one or more turbines thereof. Another use of this high temperature, high pressure water is to drive one or more stages of the compressor, as illustrated in FIG. 4. Another option is to cool the steam using dam water and then reuse the cooled steam (now liquid water) for cooling/injection purposes, or for sound suppression. Further, in some embodiments, a cooling jacket may be used. A cooling jacket is an external tank of water that surrounds gas turbine 300, similar to pipes. Water may be pumped into, or retrieved from, the cooling jacket. Further, any combination of cooling jackets, cooling coils, or any other cooling mechanism may be used.

FIG. 4 is a front view of a compressor fan stage that is driven by heated or supercritical water flowing through external blades, according to an embodiment of the present invention. While external blades are discussed here, the blades may take any form suitable for driving the compressor fan stage. In some embodiments, the compressor fan stage of FIG. 4 may be present in FIGS. 1 and/or 2. The compressor fan stage may be supplied with heated, or supercritical, water from any suitable source stemming from a heat engine.

Heated water flows through entry inlet 400 and into water conduit 410. There, the high pressure, high temperature water contacts and rotates blades, such as blade 420. The compressor fan stage rotates about shaft 440, spinning compressor fan blades 430. The rotation of compressor fan blades 430 pressurizes air and pushes the air through the compressor. Once the heated water has rotated around water conduit 410, the heated water exits water conduit 410 and flows into exit outlet 450. Thereafter, the water may be further used for various uses in the heat engine in accordance with the discussion herein, such as for sound suppression, cooling or turning a turbine, providing a source of industrial steam heat, or any other suitable use. Additionally, the hot water or steam in exit outlet 450 may be cooled using dam water. This has the added benefit of creating suction where the steam is cooled to liquid water, which increases the flow of hot water and/or steam through the compressor stage and spins the compressor stage faster. The water used to cool the steam can be around exit outlet 450 or injected into exit outlet 450.

The design of the water inlet system and the number of blades engaged between entry inlet 400 and exit outlet 450 is a matter of design choice. In this embodiment, each fan stage has its own entry inlet, water conduit and exit outlet. However, in some embodiments, multiple fan stages may share a single water conduit, or all fan stages of a given compressor section may share a common water conduit. Further, the inner wall of a water conduit may serve as a mounting surface for the blades.

In the embodiment discussed in FIG. 4, the externally-driven blades may improve efficiency over other configurations, such as an internal blade configuration. Further, in some embodiments, the internal air blades are also "shrouded" (i.e., no significant gap between the blade tip of each fan blade to the outer casing). This may reduce air losses due to blow-by.

Figure 5:
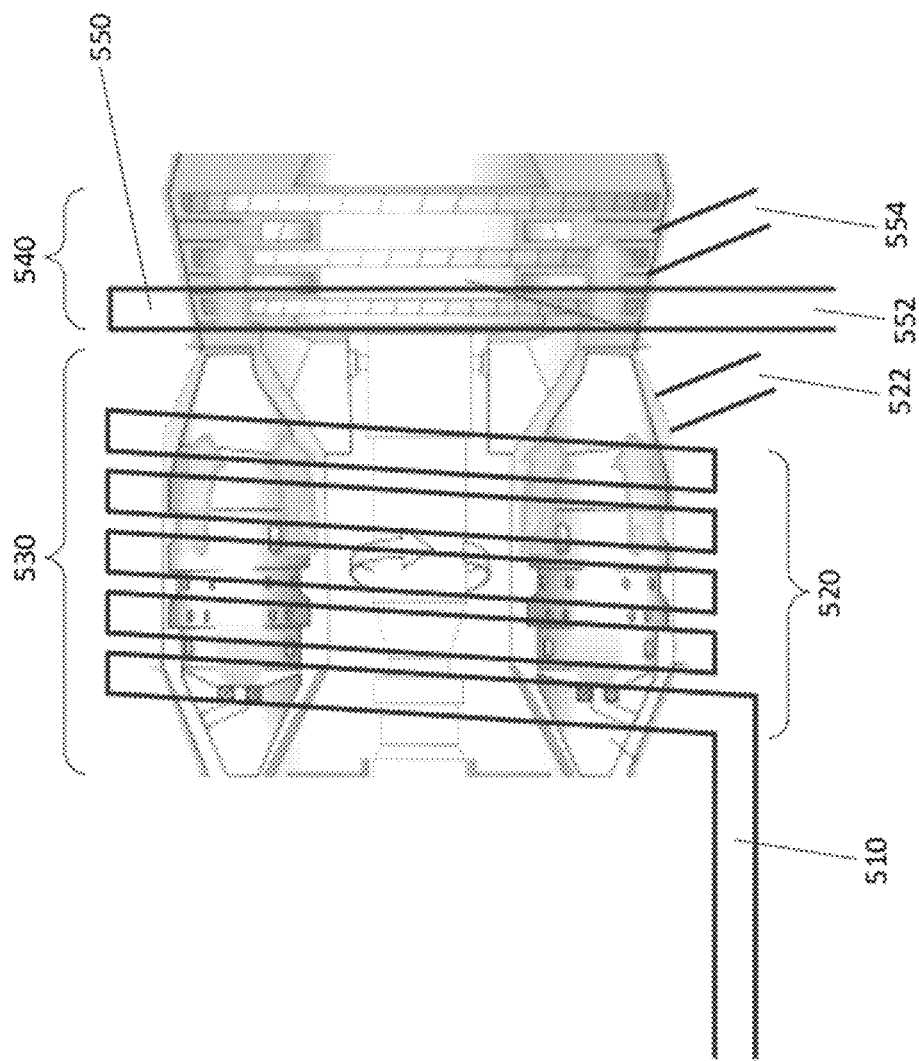
FIG. 5 is a side view of combustion chamber and turbine sections of a gas turbine and a cooling system, according to an embodiment of the present invention.

FIG. 5 is a side view of combustion chamber 530 and turbine 540 sections of a gas turbine and a cooling system, according to an embodiment of the present invention. Water from a dam flows into the cooling system via water inlet 510. Generally speaking, it is desirable to have the water be as cold as possible, particularly since combustion chamber 530 and the first turbine of turbines 540 will typically be extremely hot. Typically, the turbines will be progressively more cool towards the nozzle.

Water flows through water inlet 510 and into cooling coils 520. While cooling coils are shown in this embodiment, any suitable cooling mechanism may be used, such as a cooling jacket or cooling passages. Cooling coils 520 are water channels that wrap around the outside of combustion chamber 530. The number of cooling coils, and the extent of the combustion chamber that is cooled thereby, is a matter of design choice.

As the water flows through cooling coils 520, heat transfers from hot combustion chamber 530 to water in cooling coils 520 and the water becomes progressively warmer. The water in cooling coils 520 may heat to the point where the water is supercritical. This hot, or even supercritical, water may leave cooling coil 520 via combustion chamber outlet 522 and then be used for various purposes, such as driving one or more stages of a compressor or rotating a turbine via impulse power, as shown in FIG. 6.

A turbine coil 550 cools the first turbine of turbines 540. In this embodiment, only the first turbine is cooled by turbine coil 550 since the first turbine tends to be the hottest place on a gas turbine. In some embodiments, the water may actually enter and cool the blades via lines, or any other suitable mechanism, and then flow away from the blades. Further, water may be routed through stator blades and/or shaft support struts of the gas turbine to cool these elements.

The coolant is desired to keep the first turbine from melting, particularly since turbine blades tend to be quite thin and thus may be vulnerable to failure when the heat becomes too high. However, in some embodiments, other turbines may also be cooled in a similar fashion, or the water may flow around more than one turbine. Cool water enters turbine coil 550 via water inlet 552. The water then flows around turbine coil 550 and out through turbine coil outlet 554. The heated water may then be used for a variety of hot water uses, as discussed herein. One use for the heated water is for recuperation. Recuperation, or sending energy forward, may involve, for example, sending the heated water forward in the gas turbine to the compressor. Recuperation requires that injected coolant be hotter than the compressor (i.e., coolant taken from turbine).

Figure 6:
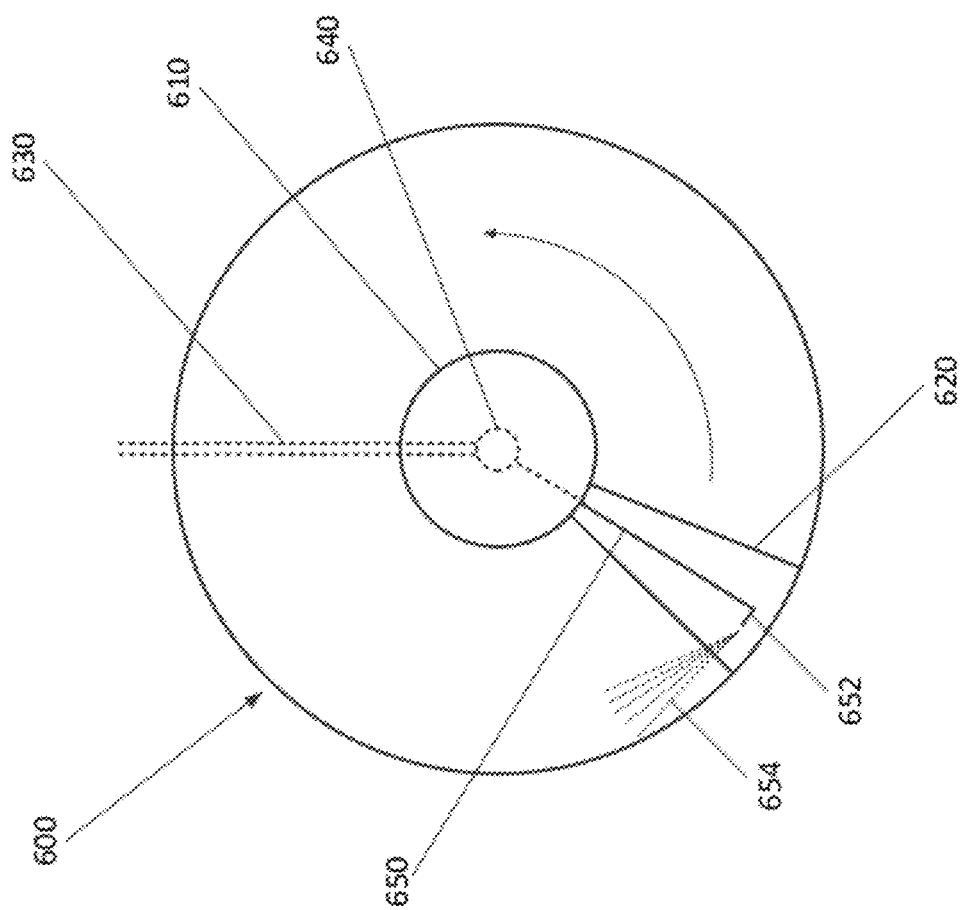
FIG. 6 is a front view of a turbine driven at least in part by impulse power, according to an embodiment of the present invention.

FIG. 6 is a front view of a turbine 600 driven at least in part by impulse power, according to an embodiment of the present invention. Here, only one blade 620 of turbine 600 is shown. Heated water flows through impulse water supply channel 630 and into impulse water distributor 640. Alternatively, and perhaps preferably, impulse water supply channel may run through a shaft 610 of the gas turbine in some embodiments Impulse water distributor 640 may be housed within shaft 610, as illustrated here Impulse water distributor 640 may have a series of valves that regulate flow of water to one or more turbine blades via turbine blade supply lines, such as turbine blade supply line 650. Water is driven through turbine blade supply line 650 and out through turbine blade impulse nozzle 652. The sprayed impulse water 654 then exerts a force that helps to cause turbine 600 to rotate.

In many cases, it is desirable for only the last turbine to be driven by impulse power to avoid damage from high speed water to subsequent turbines. However, in some cases, the water from the impulse turbine may be sufficiently vaporized such that later turbines are not damaged. In such a case, multiple impulse-driven turbines may be used.

FIG. 7 is a side view of a gas turbine 700 and a water turbine 710 with mist injection for gas turbine exhaust, according to an embodiment of the present invention. Gas turbine 700 is supplied with air via air intake 720. Water turbine 710 is supplied with flowing water via water channel 730. Water 732 exits the water channel into exit channel 750.

Many gas turbines generate a large amount of noise during operation. In order to suppress the intensity of the sound, some embodiments of the present invention use water mist In FIG. 7, mist channels 740 provide water mist either directly from dammed water or from water that has been previously used for another purpose around the gas turbine. The mist may be created by a nozzle, valve, or any other suitable mechanism (not shown). Water mist 742 is then sprayed into hot exhaust gases 722 that are leaving gas turbine 700 and flowing into exit channel 750.

Generally speaking, it is desirable to have water mist 742 be as fine as possible without having water droplets of the water mist completely disperse into water vapor. Water 732 in exit channel 750 will have some sound damping effect, but not nearly as much as a water mist This is because in principle, as many boundaries as possible between liquid and gas are desired. The density difference between the light exhaust gases and the many fine droplets of relatively heavy water is what suppresses sound. In some embodiments, it may further be possible to get secondary mist from larger hot water droplets "shattering" or "exploding". The smaller droplets from the larger shattered droplet generally will not boil. Further, some embodiments may use a cool water spray for heat damping purposes. It is desirable that air and water leaving the dam not be so warm as to negatively impact the environment. Heat damping becomes more of a concern when there is less water used in the system since water 732 in the exit channel will also have a cooling effect. Further, the longer the nozzle of gas turbine 700, the more likely heat is to be an issue.

FIG. 8 is a side view of a gas turbine and water turbine with a steam recovery system, according to an embodiment of the present invention. Gas turbine 800 is supplied with air via air intake 820. Water turbine 810 is supplied with flowing water via water channel 830. Water 832 exits the water channel into exit channel 850.

As exhaust gases 822 come into contact with water 832 in exit channel 850, the water and exhaust gases become progressively more intermingled 834 further down exit channel 850. Water vapor (steam) both pre-existing in exhaust gases from gas turbine 800 and water vapor generated by hot exhaust gases contacting water 832 tends to be carried towards the top of exit channel 850.

At a location where intermingled water/exhaust gases 834 have not yet expanded to occupy the entirety of exit channel 850, a steam capture housing 840 is located on exit channel 850. Steam capture housing 840 may be movable via mechanical or hydraulic means (not shown) in some embodiments in order to adjust the location of steam capture housing 840 to the optimum location for the current operating power of gas turbine 800. The more powerfully that exhaust gases 822 are expelled into exit channel 850, the further down exit channel 850 that intermingled water/exhaust gases 834 will expand to occupy the entirety of exit channel 850. However, in embodiments where gas turbine 800 and water turbine 810 are used to provide a base power load to the electrical grid, such a variable steam capture housing may not be desirable since the optimum location for steam capture housing placement will not change much, if at all. Many of the particulates in exhaust gases 822 will be mixed into water in intermingled water/exhaust gases 834, so water vapor towards the top of exit channel 850 tends to be rather clean. Further, cleaner, and often preferable, fuel sources such as natural gas do not put many particulates or polluting vapors into the steam.

Water in intermingled water/exhaust gases 834 has inertia and surface tension. Hence, the water tends not to pass through water vapor (steam) at/near the top of exit channel 850, but rather tends to keep going in a relatively straight direction, traveling past steam capture housing 840 and on down exit channel 850. On the other hand, steam 842 tends to rise into steam capture housing 840, and outside air 844 tends to be drawn into steam capture housing 840 via outside air vent 846. Outside air 844 has some cooling effect on steam 842. However, in some embodiments, there is no outside air vent and outside air does not enter steam capture housing 840.

Figure 9B:
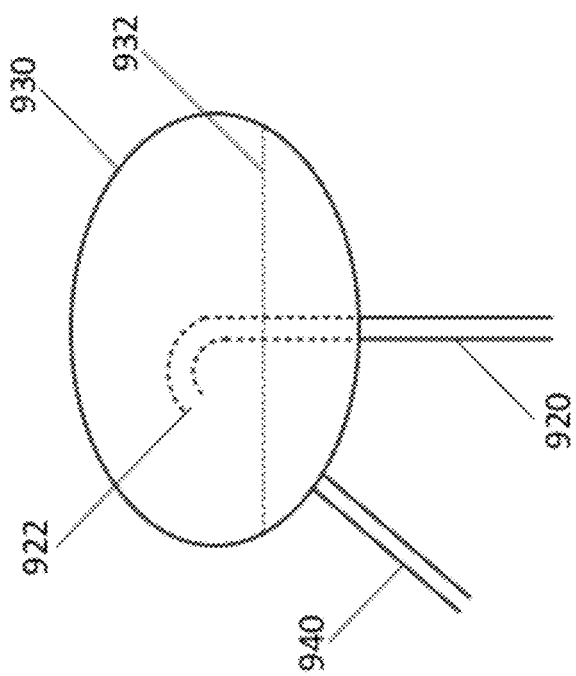
FIG. 9B is a side view of a cooling tower, according to an embodiment of the present invention.
Figure 9A:
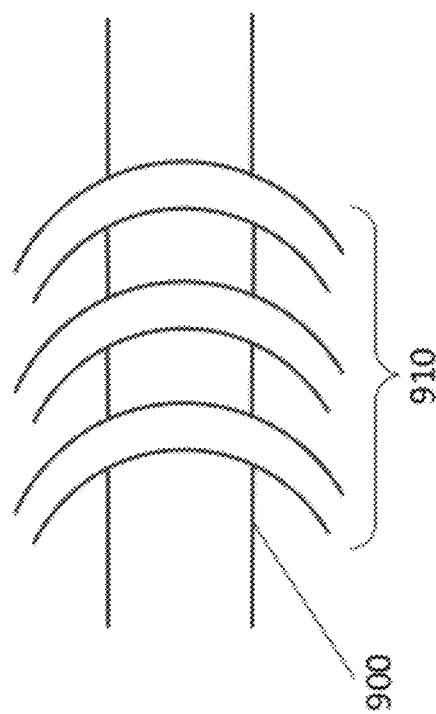
FIG. 9A is a side view of a steam transfer pipe and cooling coils, according to an embodiment of the present invention.

Due to its tendency to rise, steam 842 is drawn into steam transfer pipes 860, where the steam is transported to cooling mechanisms such as cooling coils and/or a cooling tower (see FIGS. 9A-B). There, the steam condenses into water that is generally of higher purity than water directly from a dammed source. The water may then be used for purposes such as direct injection into, or starting one or more compressor stages of gas turbine 800. If purity is not as much of a concern, the steam can be cooled by injection of dammed water.

FIG. 9A is a side view of a steam transfer pipe 900 and cooling coils 910, according to an embodiment of the present invention. Steam in steam transfer pipe 900 passes through cooling coils 910, which are external to the water in steam transfer pipe 900. Colder water, or some other coolant, flowing through cooling coils 910 cools the steam in steam transfer pipe 900. The steam then condenses into water. Since the water from condensed steam is generally of higher purity than dammed water that has not gone through high levels of filtration, the water from condensed steam may be used for purposes requiring a higher purity water source, such as direct injection into a gas turbine.

FIG. 9B is a side view of a cooling tower 930, according to an embodiment of the present invention. Steam in steam transfer pipe 920 rises into cooling tower 930. The steam exits steam transfer pipe 920 and enters cooling tower 930 above the water level 932 via an opening 922. The steam rises and is cooled by the walls of cooling tower 930. A cooled water pipe 940 carries water out of cooling tower 930 for other uses, such as starting one or more stages of a compressor configured for such a start, perhaps the compressor stage illustrated in FIG. 4. This is particularly a useful application where cooling tower 930 has a greater head than dammed water due to a greater height of cooling tower 930. Since only a limited amount of water is available in the cooling tower, and the steam therein only condenses to water at a certain rate, it is generally more practical to use water from cooling tower 930 to start one or more compressor stages rather than to permanently drive the compressor stages.

Figure 10:
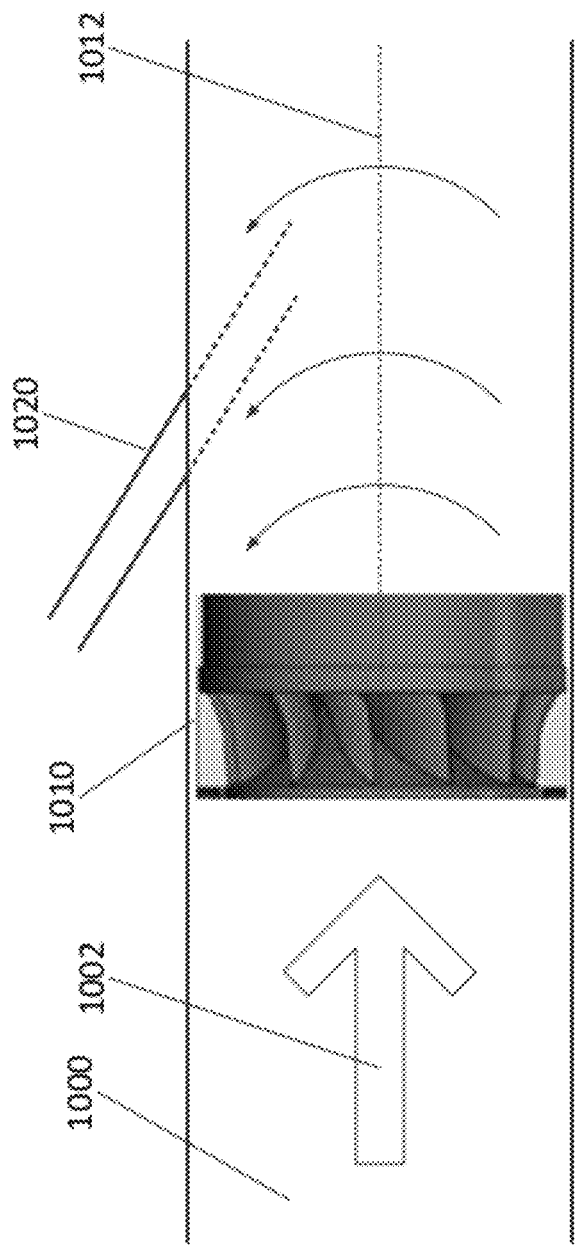
FIG. 10 is a side view of a water turbine, according to an embodiment of the present invention.

FIG. 10 is a side view of a water turbine 1010, according to an embodiment of the present invention. A water channel 1000 directs flowing water 1002 from a dammed source into water turbine 1010. In an ideal system, water flowing through water turbine 1010 would not rotate and all energy would be captured by the blades of water turbine 1010. However, in practical implementations, water turbine 1010 causes water passing therethrough to rotate about axis 1012. This causes cyclonic separation of materials in the water, and is similar in operation to a centrifuge. Materials that are heavier than water tend to travel towards the outside of water channel 1000. On the other hand, materials that are lighter than water tend to travel towards the center of water channel 1000. Accordingly, water at a certain location within water channel 1000 tends to be filtered of heavier and lighter materials.

Accordingly, filtered water collection pipe 1020 extends into water channel 1000 to a location that tends not to have heavier and lighter materials. Water is drawn through filtered water collection pipe 1020 via its own head, a pump or other suction mechanism (not shown). Thereafter, the water can be used for various purposes for a heat engine depending on the purity of the water.

FIG. 11 illustrates a method for delivering water to a heat engine, according to an embodiment of the present invention. Cool water is filtered by any suitable filtration mechanism at 1100. In some embodiments, a cyclonic separation system is used that is configured to use rotation of water in a water channel of a water turbine to filter water. The filtered water is then provided to a water inlet for the heat engine at 1110. The system at least partially uses head created by a dam to drive the water. The water is then passed to cooling coils that use the cool water for the heat engine at 1120. For instance, the water may be used externally or injected internally into the heat engine for cooling and/or to increase the mass of air in various parts of the heat engine as discussed throughout this application.

After the cool water has been used for the heat engine at 1120, the water is heated by the heat engine. This hot water is then used by a hot water supply pipe at 1130. The hot water may, for example, be injected into the heat engine after a last stage of the compressor, but before a combustion chamber. The hot water may also be used to drive one or more stages of the compressor via water pressure. The hot water may further be used to turn one or more turbine blades of a turbine of the heat engine via impulse power.

FIG. 12 illustrates a method of recovering steam from an exit channel, according to an embodiment of the present invention. Exhaust gases from a heat engine and water from a water channel are conveyed by an exit channel at 1200. The interaction of hot exhaust gases and cool water from the water channel in the exit channel creates steam. Steam is collected from the exit channel by a steam capture housing at 1210. The steam is then conveyed through one or more steam transfer pipes and passed to a steam cooling mechanism, such as cooling coils or a water tower, at 1220. The cooling mechanism then cools the steam, which condenses into water. The water tends to have a higher purity than dammed water and may then be used for various purposes, such as injection into the heat engine or to start one or more stages of a compressor when the cooling mechanism is a cooling tower and sufficient head is provided by the cooling tower.

FIG. 13 illustrates a flow diagram of a method for suppressing sound generated by operation of a heat engine, according to an embodiment of the present invention. Cool water is filtered by any suitable filtration mechanism at 1300. In some embodiments, a cyclonic separation system is used that is configured to use rotation of water in a water channel of a water turbine to filter water. The filtered water is then provided for use by one or more mist channels at 1310. Exhaust gases generated by the heat engine are conveyed by an exit channel at 1320. The one or more mist channels then spray water mist into the exhaust gases in one or more of a nozzle of the heat engine and the exit channel at 1330. In some embodiments, the one or more mist channels may spray heated water such that larger water droplets explode into smaller water droplets.

Some embodiments of the present invention are able to tap a dammed water supply to provide water for various uses in a heat engine. The water may be tapped for cooling of and/or injection into a heat engine. Further, steam from operation of the heat engine and/or directing exhaust gases of a heat engine into a water flow in an exit channel may be collected and harnessed for power generation in a steam-driven power generator, for industrial heating purposes and other industrial uses, and/or for cooling and subsequent use as potentially more pure water. Additionally, water mist may be sprayed into the exhaust gases for sound suppression purposes.

One of ordinary skill in the art will readily appreciate that the heated water and cool water available in, or produced by, various embodiments of the present invention can be used for any number of purposes, and in any combination. For instance, water may be used for purposes including, but not limited to, injection into the heat engine, external cooling via cooling coils, cooling jacket, or any other suitable cooling mechanism, sound suppression via spraying mist into the exhaust gases, driving one or more compressor stages, powering a turbine via impulse power, powering a generator via steam, supplying heated water/steam for industrial purposes, and/or supplying water to a cooling tower. Further, the use of the terms "cool" and "hot" in this application is relative to the temperature of the water before and after heating by the heat engine. Cool water may be ambient temperature water from a dam source, for instance. On the other hand, "hot" water is water that is heated by the heat engine to a higher temperature. The hot water may be of any temperature and pressure based on system implementation and tolerances. In some embodiments, hot water may be supercritical where the temperature and pressure is sufficient. While some places in the application state "hot or supercritical", hot water itself may be supercritical and this distinction is mentioned to indicate that liquid or supercritical phases of water may be used, depending on the implementation.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a heat engine comprising a gas turbine disposed within a dam, the gas turbine comprising a compressor having one or more stages of rotating blades;
a water inlet configured to provide water from a dammed water source, wherein the water inlet is configured to provide water from the dammed source that is driven, at least in part, by head created by the dam;
a water turbine in fluid communication with the water inlet;
a water channel disposed within the dam in fluid communication with the water inlet; and
cooling mechanisms in fluid communication with the water channel configured to deliver cool water to at least one of the compressor, a combustor, or a turbine section of the heat engine.

2. The apparatus of claim 1, further comprising:
a hot water supply pipe operably connected to the cooling mechanisms, wherein
the hot water supply pipe is configured to spray hot or supercritical water into the heat engine after a last stage of the compressor, but before a combustion chamber.

3. The apparatus of claim 1, wherein water from the cooling mechanisms is injected directly into the one or more compressor stages.

4. The apparatus of claim 1, wherein water from the cooling mechanisms is circulated in or around, or injected directly into, one or more turbines of the heat engine.

5. The apparatus of claim 1, further comprising:
a hot water supply pipe operably connected to the cooling mechanisms, wherein
the hot water supply pipe is configured to supply hot or supercritical water to one or more stages of the compressor, and
pressure generated by the hot or supercritical water is used to drive the one or more stages of the compressor.

6. The apparatus of claim 5, further comprising:
one or more turbine blade supply lines configured to supply one or more blades of a turbine of the heat engine with water; and
one or more turbine blade impulse nozzles configured to drive the turbine via impulse power generated by spraying pressurized water.

7. The apparatus of claim 1, further comprising: a cyclonic separation system configured to use rotation of water in the water channel of the water turbine to filter water, and configured to retrieve the water and deliver the water to the water inlet.

8. The apparatus of claim 1, further comprising:
a hot water supply pipe operably connected to the cooling mechanisms, wherein
the hot water supply pipe is configured to supply the hot water to a steam power generator to create electrical power.

* * * * *